United States Patent Office 2,895,627
Patented July 21, 1959

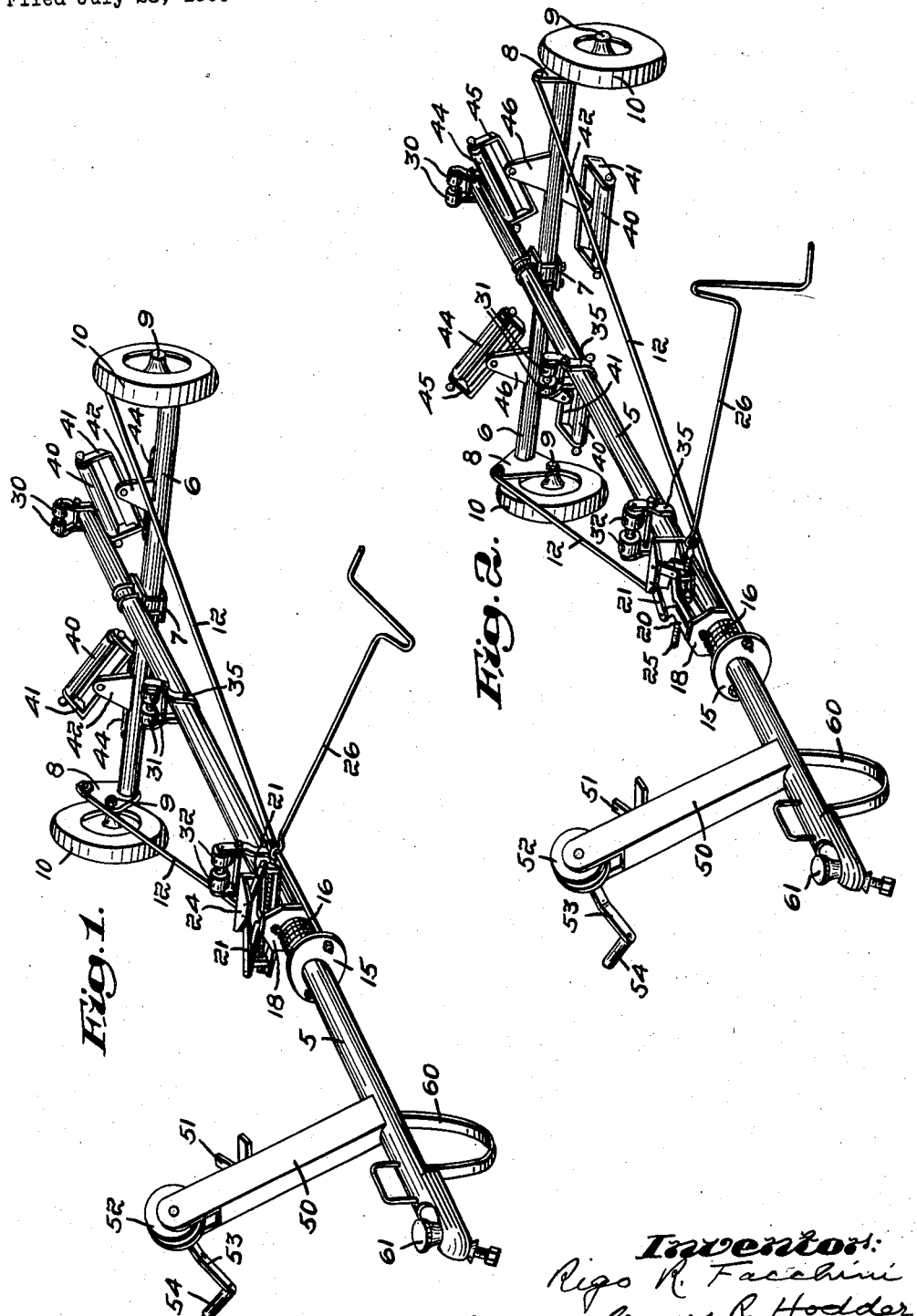

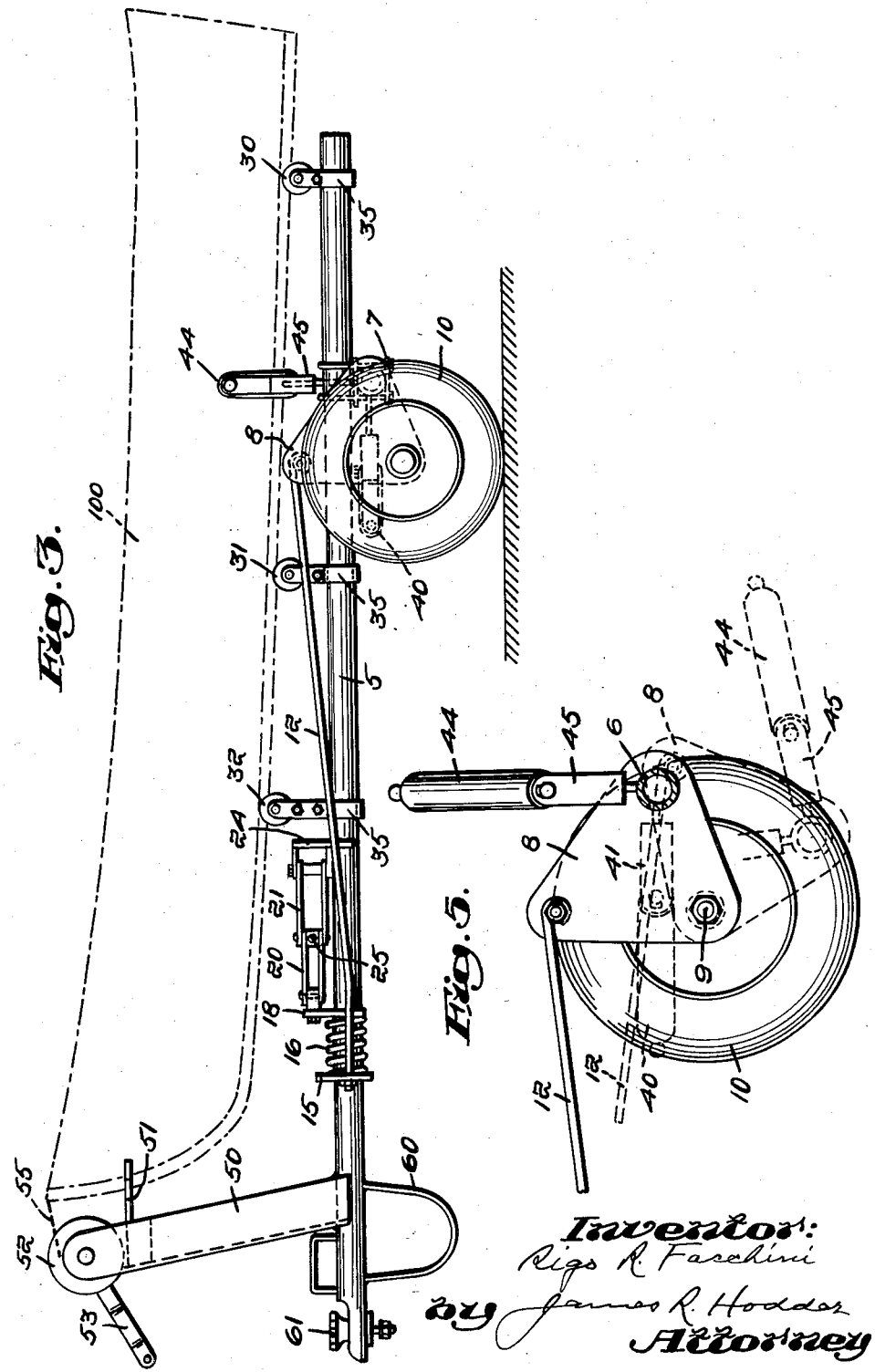

2,895,627

BOAT-LOADING, TRANSPORTING, AND LAUNCHING TRAILER

Rigo R. Facchini, Kingston, Mass., assignor of one-half to Frederick L. Carlson, Kingston, Mass.

Application July 28, 1955, Serial No. 524,859

7 Claims. (Cl. 214—84)

My present invention is a novel and improved road vehicle for use in loading small boats, runabouts, tenders, or the like on a trailer, securing the same for safe and easy transportation, and launching at any desired point.

Heretofore various types of trailers for carrying small vessels, which trailer has to be attached to an auto, truck, or the like, have been developed but none of such prior boat-carrying trailers have been entirely satisfactory, particularly in loading the boat on the trailer, transporting the same, and subsequently launching.

The object of my present invention is to improve and perfect trailers of this type and to greatly facilitate the loading and launching operations as well as to insure the cradling of the boat on the trailer and to lift the boat a substantial distance from the ground to insure safety and ease during travel.

An important feature of my present invention consists in the construction and arrangement wherein the boat-holding operation of the trailer will automatically engage and support the boat while the boat is being loaded thereon by drawing the same on the rear of the trailer forwardly until in balanced relation over the wheels of the trailer. Thus, my improvement automatically holds and balances the boat during the loading action and, similarly, during the unloading action.

My improved trailer also provides for an inclination or tilting of the boat-supporting frame rearwardly so that the extreme rear portion of the frame may be lowered adjacent to or even in contact with the ground to facilitate loading and launching. When in position for the loading operation, the boat is readily drawn onto the frame-supporting portion and in engagement with the side-steadying and supporting elements until in desired balanced position; whereupon the entire frame is raised from inclined or tilted position to substantially a horizontal relation and, thus, lifted for ample road clearance during travel.

I accomplish this lifting action by a pair of cam plates interconnected by a tubular member which carries the supporting wheels, as will be further explained.

A still further and important feature is that the boat-carrying portion of the trailer is held in its raised or horizontal position by a spring coupling between the cam plates and the frame, thus obtaining the benefit of the shock-absorbing action during travel so that the boat is free from jolts, shocks, bumps, and damage, particularly when being drawn over rough roads, beaches, or trails.

A still further feature consists in the arrangement of a plurality of boat-supporting and self-aligning series of rollers preferably attached to the cam plates, wherein the first rollers contact with the sides of the bottom of the boat to hold the same steady during the loading action, and a second series of rollers lift and steady the boat when the frame is drawn into raised and horizontal position; this action of the rollers being reversed during launching.

Other features, advantages, and improvements will be hereinafter more fully pointed out and claimed.

As shown in the drawings illustrating a preferred embodiment of the present invention:

Fig. 1 is a view in perspective of my improved boat-carrying apparatus in its lowered, loading, and launching position;

Fig. 2 is a corresponding view in perspective showing the raised and boat-transporting position;

Fig. 3 is a side view showing a boat in dotted lines ready for travel;

Fig. 5 is a fragmentary view on an enlarged scale on the line 5—5 of Fig. 4.

Figure 4:
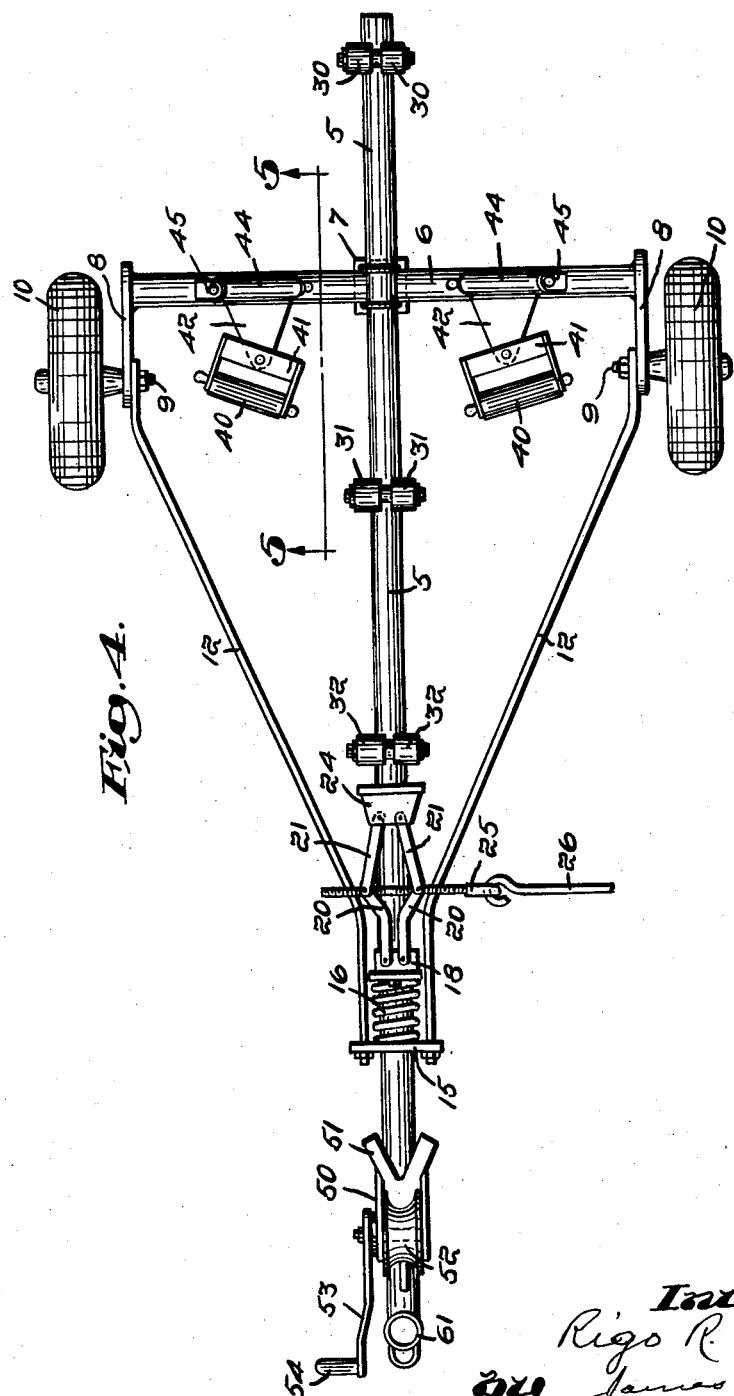
Fig. 4 is a plan view of the apparatus in raised position.

As shown in the drawings, I prefer to utilize a very light strong tubing for the main longitudinal and crosswise members, which may be of aluminum or other light metal, although other forms of metal in cross-section may be employed. For the main longitudinal member 5 there is rotatably secured thereto adjacent the rear end a cross tubular member 6 which is attached to the member 5 by a clamp 7 of any suitable type, which constitutes a bearing between the tubular members 5 and 6 and permits the cross member 6 to be rotated in said clamp.

Rigidly attached at one apex to the cross member 6, I provide a bearing for the axle 9 carrying the wheel 10 at another apex of each plate; and at the third apex of each plate I secure a rod 12. These rods from each triangle are led forwardly to a collar 15 adapted to slide upon the forward portion of the longitudinal tubular member 5, said collar resting on a spring 16 coiled around the member 5, which spring, in turn, rests against a sliding collar 18; which latter collar is, in turn, pivoted to pairs of toggle members 20—20 having the adjoining toggle members 21—21 pivoted to a collar 24 adjustably fixed on the longitudinal member 1 and actuated by a right and left screw 25 constituting a jack to actuate the pull rods 12 thru the spring 16 to raise and lower the triangular plates 8—8 and, hence, to raise and lower the rear portion of the trailer construction.

An important feature of this spring jack arrangement consists in a constant yielding operation of the load on the trailer, viz., a boat 100 shown in dotted lines, Fig. 3, which thereby automatically imparts a yielding action during travel, lessening or practically eliminating jolts, jars, and the like to the boat during travel of the trailer over rough roads.

To actuate the right and left adjusting screw 25, a handle 26 may be detachably secured in any desired manner as by a hook or the like, as shown in Fig. 4. Secured to the central tubular member 5 are a plurality of pairs of keel-engaging rollers 30—30, 31—31, and 32—32 which may be adjusted in desired position on the tube 5 by clamps 35—35. Thus, when the right and left adjusting screw 25 is rotated to release the compression of the spring 16, the pull rods 12 are moved rearwardly to rock the plate 8—8 on the axes of the wheels 10—10 and thereby to lower the cross members 6 as shown in Fig. 1.

Reverse movement of the adjusting screw and operation of the jack expands the toggle and forces the pull rods 12 forwardly thru compression of the spring 16 and thus blocks the triangular plates 8—8 on the wheel axles and raises the cross member 6 and the entire rear portion including the boat into a substantially level position for travel.

Even should the boat 100 be of greater length than that of the trailer, this action of raising and lifting the rear part and leveling the boat-carrying portions will lift the rear of the boat free of dangerous contact with the ground and holds the boat at all times in yielding tension of the spring 16 when in thus raised position.

In order to still further hold and steady the boat both during loading, unloading, and travel, I provide a novel set of side or bilge-bearing rollers, one set 40—40 being rotatably mounted on the arms of a U-bracket, 41 which bracket, in turn, is pivoted to upstanding lugs 42, 42 respectively, which are welded or rigidly secured to the outside of the cross members 6 in position to engage the boat when the trailer frame is in lowered position for loading or unloading.

As the jack actuates the pull rods to raise and lift the rear of the trailer, I provide a second set of similar rollers 44, each mounted on a U-bracket 45 which, in turn, is pivotally attached to an upstanding lug 46, which block up the bearing on the bilge of the boat and hold it steady in a raised position for travel. This is a most important feature, as these sets of roller bilge bearings each side of the keel of the boat hold the same steady and in alignment as the boat is drawn onto the trailer and during travel, as well as when unloading.

As shown in Fig. 1 with the rear of the frame in lowered position, the first rollers 40—40 are illustrated in boat-engaging position, while the second set of rollers 44 are extending at substantial right-angles thereto.

In Figs. 3 and 4, showing the boat in lowered position and the frame raised to horizontal alignment, a second set of rollers 44 will be in boat-engaging position. To facilitate the loading and unloading operation and to steady the boat 100 in loaded position, I provide at the forward end of the trailer an upright 50 which is rigidly secured to the tubular member 5 and is equipped with a stem-engaging brace as indicated at 51, and in the upper portion is forked to carry a reel 52 operated by a crank 53 and handle 54 to wind up a rope 55 attached to the bow of the boat.

Thus in operation with the trailer frame lowered, it is positioned adjacent the bow of the boat if on land, or may be backed down the beach or ramp if the boat is in the water and the painter wrapped around the reel 52 and with the crank rotated to wind up the painter draws the boat over the rollers, the side rolls 40—40 picking up the load and facilitating the loading action until the bow of the boat strikes the brace 51. Thereupon, the frame is raised to horizontal position by manipulating the jack and rotating the plates 8—8 on the wheel axles as fulcrums, thereupon lifting the second set of bilge rollers 44 into position to engage the boat on each side and hold it steady during travel.

Reverse operation permits the boat to be slid easily down the incline accorded by the lowering of the rear part of the trailer, as will be readily appreciated.

A usual type of rest 60 is fitted at the forward end of the frame 5, and a hatch clamp 61 is shown.

I claim:

1. A boat trailer of the kind described comprising a boat-carrying frame, supporting wheels therefor, a plurality of anti-friction elements for boat-loading and unloading, a plurality of pairs of side-supporting rollers, a pair of cam plates to which said side rollers are pivotally secured in spaced relation for self-seating on the boat being loaded, yielding means to move said cam plates for successive contact of adjacent pairs of rollers on the boat, thereby to move the boat and frame-carrying portion from inclined loading to horizontal carrying positions, in combination with a winch at the forward end of the trailer to draw a boat onto said frame during the loading action.

2. Construction as set forth in claim 1, wherein a plurality of pairs of side-supporting rollers to engage the bottom of the boat are provided, one set being operative with the rear of the boat-carrying frame in lowered position, and a succeeding pair being actuated to boat-carrying position during the lifting of the frame to horizontal traveling relation.

3. Construction as set forth in claim 1, wherein each pair of side rollers are pivotally secured to the frame cross member.

4. A boat trailer of the kind described comprising a boat-carrying frame having a longitudinal member and a cross-wise member adjustably united, a pair of supporting wheels, a triangular cam plate adjacent each wheel and pivotally attached at one apex to the axle of its adjacent wheel, said cross-member extending between said wheels and being pivotally attached at its opposite ends to another apex of each cam plate, a slide and jack on the forward portion of said longitudinal member, two side rods, one of each extending from said slide to the third apex of one of each of said triangular plates to raise and lower the cross-member relatively with the wheel axles through the operation of said jack.

5. Construction as set forth in claim 4 including a toggle between said slide and both of said rods.

6. Construction as set forth in claim 4 wherein said rods are normally above the wheel axles when the cross-member is in lowered position, thereby providing greater leverage at the inception of the lifting movement by the rocking of said cam plates.

7. A boat trailer of the kind described comprising a boat-carrying frame having a longitudinal member and a cross-wise member united, a pair of supporting wheels, a triangular cam plate adjacent each wheel and pivotally attached at one apex to the axle of its adjacent wheel, said cross-member extending between said wheels and being attached at its opposite ends to another apex of each cam plate, a slide and jack on the forward portion of said longitudinal member, two side rods, one of each extending from said slide to the third apex of one of each of said triangular plates to raise and lower the cross-member relatively with the wheel axles through the operation of said jack.

References Cited in the file of this patent

UNITED STATES PATENTS

| | | |
|---|---|---|
| 2,487,701 | Getz | Nov. 8, 1949 |
| 2,506,699 | Byrd | May 9, 1950 |
| 2,636,745 | Cartwright | Apr. 28, 1953 |
| 2,650,730 | Rohm | Sept. 1, 1953 |
| 2,676,716 | Sallis | Apr. 27, 1954 |
| 2,719,726 | Johnston | Oct. 4, 1955 |
| 2,723,038 | Peterson et al. | Nov. 8, 1955 |
| 2,733,823 | Evans | Feb. 7, 1956 |
| 2,740,543 | Mounson et al. | Apr. 3, 1956 |
| 2,740,639 | Eckroad | Apr. 3, 1956 |